May 7, 1940.  F. P. KRETCHMER  2,199,825
EXTRUSION DEVICE
Filed Sept. 18, 1937
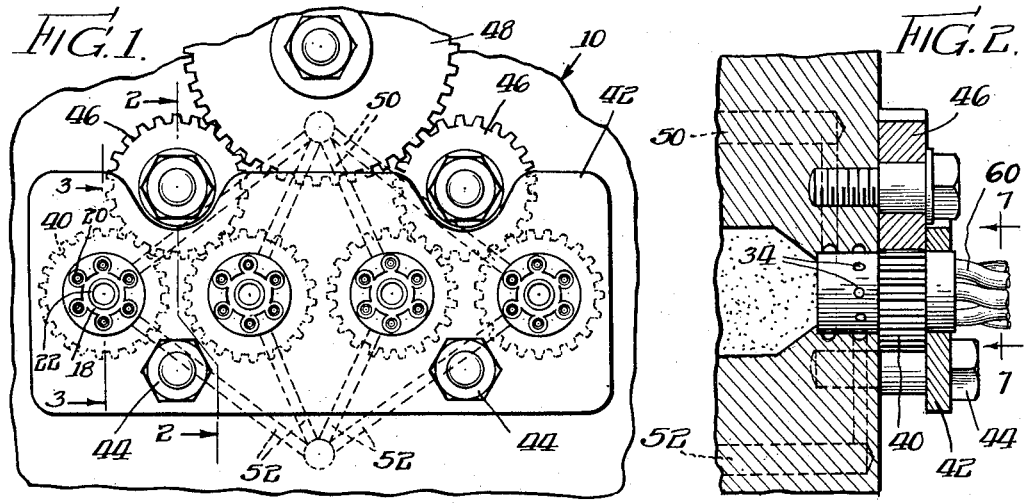
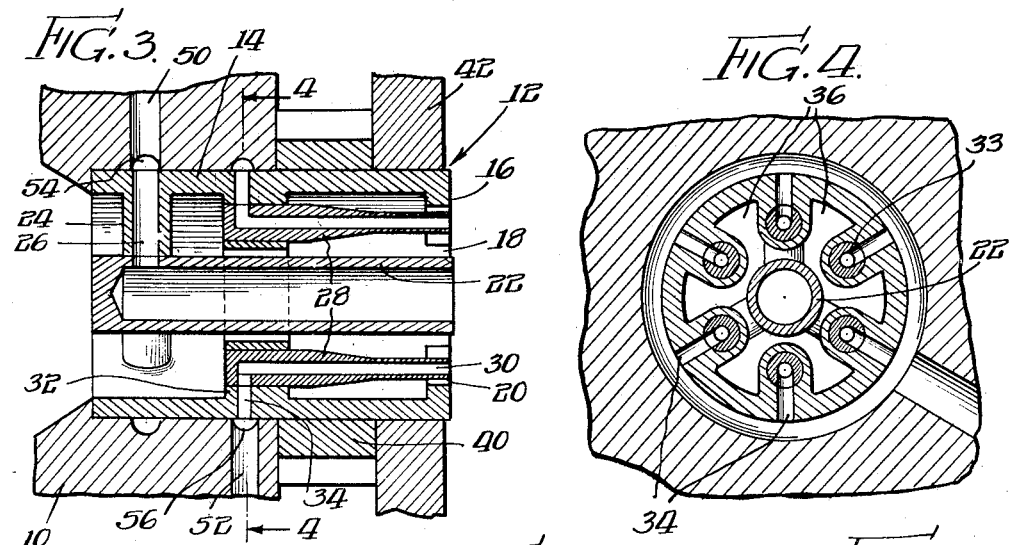
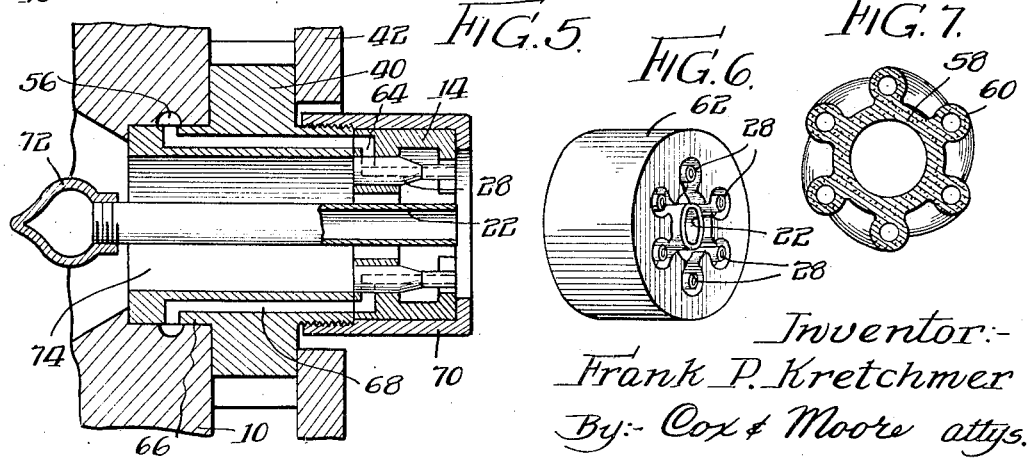
Inventor:-
Frank P. Kretchmer
By:- Cox & Moore attys.

Patented May 7, 1940

2,199,825

UNITED STATES PATENT OFFICE 2,199,825

EXTRUSION DEVICE

Frank P. Kretchmer, Chicago, Ill.

Application September 18, 1937, Serial No. 164,506

6 Claims. (Cl. 107—14)

The present invention relates to an extrusion device.

An adidtional object of the present invention is to provide an extrusion apparatus for producing an integral extruded section having spaced interior apertures therein, which device may be employed for the extrusion of plastic materials in general.

Another object of the present invention is to provide an extrusion nozzle capable of producing a tubular product with one or more tubular integral portions radially spaced from the axis thereof.

It is a further object of the present invention to provide an extrusion device, such as the above, wherein the orifice is so designed as to produce a product wherein the spaced tubular portions may be relatively rotated during extrusion so that the resulting product comprises spirally arranged portions and wherein means is provided, in combination with the extrusion orifice, to support all of the tubular portions of the extruded product during and after extrusion from the interior thereof so as to maintain their symmetry and tubular form free from distortion or interior adhesion while being twisted and/or conveyed from the device.

Numerous other objects and advantages will more fully appear during the course and progress of the following specification.

Referring to the drawing:

Fig. 1 is an elevational view of an extrusion machine constructed in accordance with the present invention.

Fig. 2 is a sectional elevation taken on the line 2—2 in Fig. 1.

Fig. 3 is a sectional elevation taken on the line 3—3 in Fig. 1.

Fig. 4 is a sectional elevation taken on the line 4—4 in Fig. 3.

Fig. 5 is a vertical sectional elevation taken centrally through an alternative type of extrusion device.

Fig. 6 is a perspective view of the nozzle shown in Fig. 5.

Fig. 7 is a sectional view showing the product produced in accordance with the above machine.

The device, shown in Figs. 1 to 4 of the drawing, comprises a structure specifically constructed for the purpose of manufacturing twisted licorice candy but it will be apparent that this structure is merely described for the purpose of illustrating the present invention which may be equally well applied to the manufacture of any other extrusion product having integral, spaced, tubular portions and particularly wherein certain of the tubular portions are desired to reside spirally with respect to the axis thereof. The structure shown in the figures comprises a pressure device 10, interiorly of which is provided a body of the plastic material to be extruded, in this case a suitably prepared and cooked body of licorice or other plastic candy. Pressure containers of this type are commonly known and are provided with pistons, spiral compressors or other pressure-applying means in order to force the licorice through the extrusion orifice and accordingly these details are not shown.

An extrusion die or orifice constructed in accordance with the present invention, shown more clearly in Figs. 2 and 3, and designated generally by the numeral 12, comprises a cylindrical body portion 14 having a front face 16 in which is formed a central, cylindrical aperture 18 and a plurality of smaller cylindrical apertures 20 arranged about the circumference thereof and so formed that they reside tangentially of the periphery of the central aperture. More specifically, the outer apertures 20 are drilled in the front face 16 so that the apertures formed thereby are continuous with the central opening 18, as a result of which plastic material extruded under pressure therethrough will provide a continuous, integral section.

According to the present invention, however, the portions extruded through the various cylindrical apertures are to be tubular in nature; that is, to comprise a central void or hollow space throughout their length and to this end means is provided centrally of each of the aforementioned apertures for maintaining this tubular configuration.

Thus, as shown clearly in Figs. 1, 3 and 4, the cylindrical pipe or conduit 22 is arranged coaxially with the central aperture 18 and is rigidly secured to the cylindrical body 14 of the extrusion die by means of the plurality of radially extending struts 24 which are annularly spaced so that they will not interfere with the free flow of the plastic material from the interior of the plastic container to the extrusion apertures. Each of the struts 24 is provided with a central bore communicating with the interior of the conduit 22 for supplying air under pressure from a source which will be hereinafter described more in detail.

The conduit 22, as viewed in Fig. 3, is sealed at its lefthand end so that the air draft will be directed interiorly of the plastic tubular member produced by the flow of plastic material through the aperture 18. In other words, the annular tubular section thus produced by extrusion will be maintained in extended position by the fluid pressure introduced centrally thereof.

Substantially the same effect is produced with regard to the radially offset apertures 20 through the agency of the jets 28 which are provided with a central bore 30 extending almost to their inner end. Each of the jets has a reduced diameter adjacent the vicinity of the apertures 20 equal to the interior diameter of the respective tubular portion in the final extruded article. These jets are supported in a radially inwardly extending, annular flange 32 of the tubular member 14 and are secured rigidly in suitably spaced apertures co-axial with the apertures 20.

According to one method of manufacturing the present device, a plurality of the aforesaid apertures 33 may be bored in the flange 32 (in the present embodiment, six in number) and the jets 28 forced therein under pressure. Radial bores extend inwardly from the periphery of the cylindrical member 14 and interconnect with the central bore 30 of the jets for supplying compressed air thereto in the manner aforementioned. As shown more clearly in Fig. 4, the inwardly extending annular flange 32 is relieved intermediate of the jet supporting portions, as indicated by the numeral 36, so that the plastic material to be extruded will find ready access to the annular space 38 and thus provide an adequate supply of material for feeding the apertures 20.

The present extrusion die is rotatably positioned in a suitable cylindrical aperture in the wall 10 of the pressure container and is provided with an integral spur gear 40 so that it may be continually rotated, the parts being maintained in the position shown during said rotation by means of the face plate 42 rigidly secured in spaced relationship with respect to the front wall 10 by means of the stud bolts 44. As clearly shown in Fig. 3, the face plate 42 removably retains the entire extrusion die rotatably within the bearing aperture in the member 10. For rotating the assembly, the gear 40 meshes with the gear 46 which in turn is rotated by the gear 48 from any suitable source (not shown).

It will be noted that the structure shown in Fig. 1 comprises a series of four extrusion units mounted on the same pressure device 10 and operable from the same gear 48. The compressed air jets are supplied through the agency of the ducts 50 and 52, which are formed in the wall of the device and extend to any suitable fitting for connection to a compressed air machine. Each of the ducts 50 terminates in an annular groove 54 formed completely about the interior surface of the aforementioned circular aperture in which the cylindrical portion 14 of the die is rotatably supported. Since the annular groove 54 is so arranged as to coincide with the bore 26, air is continually supplied thereto regardless of the rotational position of the die. The ducts 52 similarly terminate in annular grooves 56 which register at all times with the bore 34, thus supplying the jets 28 with a continual blast of air during rotation of the device.

In operation, the rotatable extrusion dies are all set into continuous rotation through the agency of the gears 48, 46 and 40, at which time the plastic mass interiorly of the container 10 passes through the annular space between the tube 22 and the inner wall of the cylindrical body 14 and past the supporting struts 24. Upon reaching the inwardly extending flange member 32, the mass continues to flow through the relieved or cut-away portions 36 and through the space adjacent the outer wall of the tube 22 and into the annular space 38 in which are situated the jets 28.

The material, as it subsequently issues through the apertures 18 and 20, will obviously possess the sectional configuration shown in Fig. 7, namely, comprising a central, cylindrical, tubular portion 58, about the periphery of which are spirally arranged six smaller tubular portions 60. As this section issues from the nozzle, the air under compression is forced continually from the bore 30 of the jets 28 and the pipe 26, as a result of which the product is maintained in the form shown in spite of the deforming and twisting stresses applied, as mentioned above. The product, as formed, may be continually conveyed or removed in any conventional manner.

According to the alternative preferred embodiment shown in Figs. 5 and 6, the die portion 62 is readily separable from the remainder of the device for cleaning and adjustment and comprises a cylindrical portion having apertures 18 and 20, as defined heretofore in detail. Jets 28, arranged in substantially the same manner as aforementioned, communicate with ducts 64 which open rearwardly of the unit, as shown in Fig. 5. The die is in turn supported in a sleeve member 66 in the wall 10 which is provided with a plurality of ducts 68 normally registering with the ducts 64 and driving a supply of air under pressure through the agency of the annular groove 56.

The die is removably secured to the sleeve 66 through the agency of the collar 70 threadably mounted thereon. Thus, by the application of a wrench or other suitable tool, the collar 70 may be removed from the sleeve 66. According to the present embodiment, however, the central tube or pipe 22 is not rotatable with the die but is fixedly positioned, being mounted upon the conduit 72 mounted interiorly of the pressure chamber of the device by means of brackets (not shown) and extending through the walls thereof to the source of compressed air. It will be apparent that, in operation, the plastic mass will be forced through the annular space 74 and outwardly of the extrusion orifices in the manner aforementioned.

The present invention provides a device which is simple in structure, yet capable of producing a novel form of extruded product free from imperfections. The present device will obviously find many uses in the formation of extruded products having integral, yet spaced, tubular portions and the present invention comprehends the application thereof to any such uses.

The instant device is particularly applicable to the manufacture of candies and especially plastic licorice products of the class sometimes referred to as "twists". Articles of this class find increasing popularity when they are formed with thin wall sections which seem to render them of increased palatability. Such a confection produced in the instant device, while possessing relatively thin walls throughout, has a considerable interior and exterior surface area and is surprisingly large in appearance with respect to the actual amount of material employed per unit section.

Moreover, it has been found that the provision of the multiplicity of jets enables the formation of a product with tubular portions having unusually thin walls which are retained in the normal tubular configuration shown, by the applied draft of compressed fluid even though subjected to considerable strain by the twisting action of the extrusion device or by the conveyors.

While compressed air has been mentioned above, it will be obvious that any equivalent fluid could be employed for distending the extruded product. Futhermore, the shape and configuration of the extrusion apertures may be varied within wide limits. It is preferable, though not essential, to extend the tube 22 slightly outwardly from the face of the die 16, as shown in Fig. 3.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. An extrusion device comprising an extrusion die having an annular extrusion aperture therein, a second annular aperture offset from said first mentioned aperture but continuous therewith, means for rotating said die as a unit to produce a twist, means for supplying a plastic to said apertures, and conduit means centrally of each of said apertures for supplying centrally of the extruded plastic a filling material.

2. An extrusion die having an extrusion orifice therein, a further extrusion orifice intersecting the periphery of said first named orifice and continuous therewith, means for rotating said die as a unit to produce a twist, means for supplying a plastic to said extruded portions, and conduit means centrally of each of said extruded portions for supplying a fluid under pressure centrally of the extruded portions.

3. An extrusion die having an annular extrusion orifice therein, said die having a further plurality of annular extrusion orifices arranged outwardly of said first named orifice and intersecting the periphery thereof, said plurality of orifices being arranged tangentially with respect to said first named orifice and being continuous therewith, means for rotating said die as a unit to produce a twist, means for supplying a plastic to said extruded portions, and conduit means centrally of each of said extruded portions for supplying a fluid under pressure centrally of the extruded portions.

4. An extrusion device comprising an extrusion die having an annular extrusion aperture therein, a second annular aperture offset from said first mentioned aperture but continuous therewith, said die being rotatable about the axis of said aperture to produce a spiral product, means to rotate said die during extrusion, and means for continuously supplying fluid under pressure centrally of each of said annular apertures while the die is rotated.

5. An extrusion die having an annular extrusion orifice therein, said die having a plurality of annular extrusion orifices arranged outwardly of said first named orifice and intersecting the periphery thereof, said plurality of orifices being arranged tangentially with respect to said first named orifice and being continuous therewith, means to feed plastic material to said die for extrusion, means to continually rotate said die about its axis, and means for continuously supplying fluid under pressure centrally of each of said annular apertures while the die is rotated.

6. A rotatably mounted extrusion die having an outer face, an aperture of circular section centrally and axially arranged upon said face, a plurality of additional circular apertures arranged about the periphery of said first named aperture and extending outwardly therefrom but continuous therewith, fluid supply conduits arranged centrally of said second named apertures and being of lesser extent than said apertures to provide an annular extrusion space thereabout, means to rotate said die during extrusion, and means to supply said conduits with fluid under pressure to maintain a tubular section in the material extruded therefrom.

FRANK P. KRETCHMER.